United States Patent
Vitaladevuni (10) Patent No.: US 9,443,198 B1
(45) Date of Patent: Sep. 13, 2016

(54) LOW LATENCY CASCADE-BASED DETECTION SYSTEM

(71) Applicant: Amazon Technologies, Inc., Reno, NV (US)

(72) Inventor: Shiv Naga Prasad Vitaladevuni, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 400 days.

(21) Appl. No.: 14/192,009

(22) Filed: Feb. 27, 2014

(51) Int. Cl.
| | |
|---|---|
| G06F 9/44 | (2006.01) |
| G06N 7/02 | (2006.01) |
| G06N 7/06 | (2006.01) |
| G06N 5/04 | (2006.01) |
| G06N 7/00 | (2006.01) |
| G06N 99/00 | (2010.01) |
| G06N 5/02 | (2006.01) |
| G06K 9/62 | (2006.01) |

(52) U.S. Cl.
CPC ............ *G06N 5/048* (2013.01); *G06K 9/6256* (2013.01); *G06K 9/6269* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 7,634,142 B1* | 12/2009 | Bourdev | ............... | G06K 9/6282 382/224 |
| 2008/0319932 A1* | 12/2008 | Yih | ...................... | G06K 9/6256 706/20 |
| 2009/0018980 A1* | 1/2009 | Zhang | ................. | G06K 9/00288 706/12 |
| 2009/0018981 A1* | 1/2009 | Zhang | ................. | G06K 9/00288 706/12 |
| 2009/0018985 A1* | 1/2009 | Zhang | ................... | G06K 9/6257 706/20 |
| 2010/0179811 A1* | 7/2010 | Gupta | ...................... | G10L 15/22 704/235 |
| 2014/0169688 A1* | 6/2014 | Dollar | ................... | G06K 9/6227 382/224 |
| 2014/0185925 A1* | 7/2014 | Datta | ................... | G06K 9/6256 382/159 |

OTHER PUBLICATIONS

Multiple-Instance Pruning for Learning Efficient Cascade Detectors—2007 Cha Zhang and Paul Viola Microsoft Research, One Microsoft Way, Redmond, WA 98052 fchazhang,violag@microsoft.com.*

* cited by examiner

*Primary Examiner* — Kakali Chaki
*Assistant Examiner* — Ababacar Seck
(74) *Attorney, Agent, or Firm* — Knobbe, Martens, Olson & Bear, LLP (57) ABSTRACT

Features are disclosed for detecting an event in input data using a cascade-based detection system. Detection of the event may be triggered at any stage of the cascade, and subsequent stages of the cascade are not reached in such cases. Individual stages of the cascade may be associated with detection thresholds for use in triggering detection of the event. The sequence of stages may be selected based on some observed or desired operational characteristic, such as latency or operational cost. In addition, the cascade may be modified or updated based on data received from client devices. The data may relate to measurements and determinations made during real-world use of the cascade to detect events in input data.

23 Claims, 5 Drawing Sheets

LOW LATENCY CASCADE-BASED DETECTION SYSTEM

BACKGROUND

Computing devices can be used to recognize faces, voices, handwriting, and other objects, patterns and the like. In a typical implementation, a computing device can continuously monitor a particular input stream (e.g., a video stream from a video camera or an audio stream from a microphone), or receive a batch of similar input data. The computing device can determine whether a portion of the input is likely to contain information corresponding to the target item, object, or pattern to be detected. For example, the computing device can determine whether a particular portion of the input stream is likely include to any face, any speech, or any handwriting at all. Once this preliminary determination has been made, the computing device can then perform other processing or cause other processing to be performed. For example, the computing device may perform recognition of which particular face, voice or other target is present in the input, rather than detecting that any face/voice/etc. is present in the input.

One approach to implementing a detection system is to use a cascade-based detector. Cascade detectors process input samples through a sequence of classifiers that score the sample on how likely it is to contain an event of interest. At each stage of the cascade, a decision is made to either discard the sample under consideration or to pass it on to the next stage. A sample that passes through all the stages of the cascade is hypothesized to contain the event of interest; otherwise, the sample is hypothesized to not contain the event. Therefore, each stage only observes samples that have passed through all of the previous stages, and have therefore not been rejected by any previous stage.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure relates to a cascade-based detection system that can return a detection of an event in a sample without processing the sample at every stage of the cascade. The various stages of the cascade-based detection system may each use separate thresholds for detections and rejections. The thresholds, sequential order of the cascade stages, or both can be set such that the operational cost and/or latency associated with using the cascade is reduced or minimized, thereby providing a better overall user experience.

Detection systems, such as systems configured to detect the presence of a face in video input or speech in audio input, can determine how likely it is that a given input includes a specific event (e.g., a face or user speech), also referred to herein as a detection target. One conventional approach to detection is to process a sample through a cascade classifier, also referred to herein as a detection cascade or simply as a cascade, that includes a sequence of classifiers that score the sample on how likely it is to contain the detection target. At each stage of the cascade, a decision is made to either discard the sample under consideration or pass it on to the next stage. A sample that passes through all the stages of the cascade is hypothesized to contain the detection target. The operational cost of conventional cascade-based detection systems is directly related to the computing resources and time used to process negative samples (samples which do not contain the detection target), which typically outnumber the positive examples (samples which do contain the detection target) by several orders of magnitude. The latency of such detectors is directly related to length of time it takes to determine that a true positive sample includes the detection target, in which case the sample must be sequentially processed by every stage of the cascade in order to trigger the detection. Many cascade detection systems are optimized for maximum accuracy. The operational cost may be a secondary consideration and, in many cases, minimization of latency may be a lower priority (or not a priority at all). For example, a facial detection system may separate an image into many separate sub-windows, and each sub-window must be processed for the presence of a potential face (e.g., the image may include many faces, each of which should be detected). Latency associated with detection of an event in a particular sub-window may not be significant in comparison with, e.g., the computational costs associated with processing the entire image or sequence of images.

Some aspects of the present disclosure relate to generating and using cascade-based detection systems that can return a detection of a detection target at any stage of the cascade, rather than only after all stages have processed an input sample. In this way, the overall latency of the system when triggering detection of a detection target is reduced in comparison with a cascade-based detection system that requires a sample to pass through every stage in order to trigger detection. Such prioritization on reducing latency can be useful in time-sensitive applications, such as interactive multi-turn speech recognition with a user. When a user expects a response quickly (if not immediately), minimizing latency can be a priority even if such minimization has a somewhat negative effect on accuracy. By short-cutting the detection of a particular word or phrase in spoken input from a user, the system can more quickly respond to the user. Users may value a reduction in latency over maximum accuracy, and may therefore be willing to accept occasional false-detections or false-rejections when the overall latency of correct detections is reduced in most cases.

To facilitate triggering detection of a detection target at any stage of the detection cascade, each stage may be associated with both a detection threshold and a rejection threshold. Instead of requiring the sample to pass every stage of the cascade in order to trigger a detection, the detection system can immediately trigger detection of a detection target at any stage in which a detection score (e.g., a confidence score) meets or exceeds a detection threshold.

The detection system can also trigger rejection of a sample at any stage in which a detection score fails to meet or exceed a rejection threshold (or, in some embodiments, when a separately calculated the rejection score meets or exceeds a rejection threshold). The detection and rejection thresholds may be set or chosen to improve certain performance-related characteristics of the detection system, such as reduction or minimization of operational cost and/or latency. For example, the rejection threshold of one stage may be set lower or higher than the rejection threshold of a subsequent stage based on an empirical analysis of the number of false positives that such a threshold would allow to be passed on to the subsequent stage, the effect on the overall latency of the system, etc.

Additional aspects of the disclosure relate to setting the sequence of stages in a cascade to improve certain performance-related characteristics of the detection system, such as reducing or minimizing operational cost and/or latency. A trained cascade may be associated with detection and rejection thresholds, as described above. A pair of stages of the cascade may then be swapped, and the re-sequenced cascade may be used to process an input sample (e.g., from the training data). Data regarding the operation of the cascade (referred to herein as execution data or performance data) may be recorded, such as the number of stages the sample passes or the elapsed time before a detection or rejection is triggered, the detection scores computed at each stage, the accuracy of the triggered detection or rejection, etc. The process may be repeated for multiple input samples in order to obtain a sufficient amount of execution data. Subsequently, another pair of stages may be swapped, and the logging of execution data may be performed again. This process may be repeated until all permutations (or some subset thereof) of stage sequences have been processed. The best performing sequence permutation, from a cost and/or latency standpoint, may then be chosen and implemented in the cascade that is deployed to client devices for use.

Further aspects of the disclosure relate to reconfiguring or otherwise modifying the cascade based on an analysis of the cascade's operation in real-world use. The cascade may be deployed to any number of client devices for use in detection systems. During normal operation, execution data may be logged each time the detector is executed, or for some subset of executions. The data that is logged may similar to the execution data described above (e.g., number of stages until a detection/rejection is triggered, elapsed time, detection scores at each stage, etc.). The execution data from client devices may be aggregated and compared to execution data from the training or testing of the cascade. If the performance of the cascade differs from the expected performance, operational parameters of the cascade may be modified. For example, detection and/or rejection thresholds may be modified, the sequence of stages may be modified, the cascade may be re-trained, etc. Configuration data regarding the updated operational parameters may then be provided to the client devices for implementation. In some cases, an entirely new version of the cascade may be provided, rather than only configuration data such as thresholds or model parameters. In some embodiments, operational parameters for a cascade may be modified for a particular user or client device. For example, a particular user may use the detection system in an acoustic environment that affects the detection of true positive samples differently than the average acoustic environment for which the cascade has been trained. In such cases, execution data may be analyzed, and modifications may be made to the operational parameters of the cascade used by that particular user's detection system.

Aspects of the embodiments described in the present disclosure will focus, for the purpose of illustration, on a client device that transmits data to a networked spoken language processing system for processing when confidence in detection of a key word or phrase exceeds a threshold. However, the systems and techniques described herein may be used in any number of processes or applications for detecting events in samples of data, including face detection, handwriting detection, triage, and other detection and/or recognition systems. As used herein, a sample of data can include any relevant portion of data, such as several seconds of audio, an image or portion of an image of a person, and so forth. In addition, although certain examples and embodiments will be described with respect to confidence scores, the systems and techniques described herein may be applied to any type of detection score, including likelihoods, probabilities, etc. Various aspects of the disclosure will now be described with regard to certain examples and embodiments, which are intended to illustrate but not limit the disclosure.

Cascade with any-Stage Detection

Figure 1:
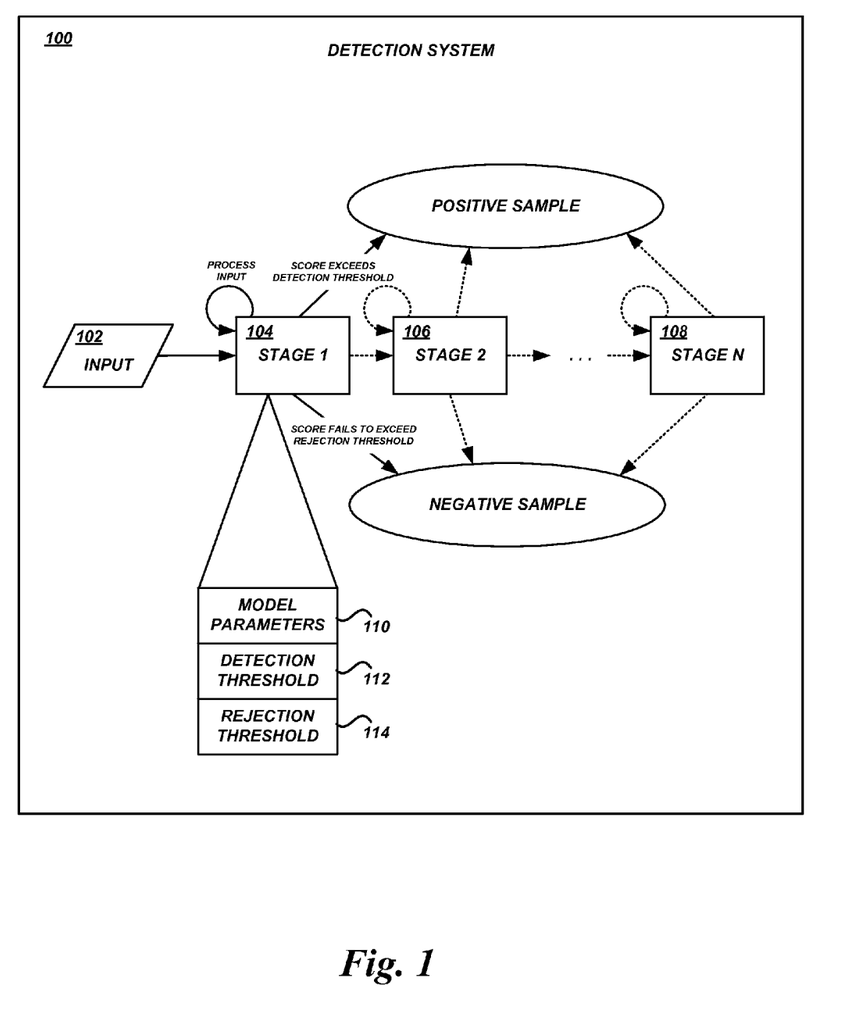
FIG. 1 is a block diagram of an illustrative cascade-based detection system configured to return a positive detection at multiple stages.

With reference to an illustrative embodiment, FIG. 1 shows a cascade-based detection system 100 in which a detection target may be detected in an input sample at any stage of the cascade. The cascade may include any number of stages. The cascade illustrated in FIG. 1 consists of stages 1 through N (labeled 104-108), where N may be any positive integer. Individual stages, such as stage 1 104, include or are associated with various operational parameters. For example, stage 1 104 includes model parameters 110, a detection threshold 112, and a rejection threshold 114. Each stage may include its own version or copy of the operational parameters, or multiple stages may share one or more operational parameters. For example, each stage may use the same detection and rejection thresholds, but each stage may use a separate set of model parameters. As another example, each stage may use a different detection and/or rejection threshold than each other stage (or some subset thereof).

In operation, an input 102, such as an audio file or stream (or a portion thereof) is processed by the first stage 104 of the cascade. The stage 104 can use a model based on the model parameters 110 to determine a confidence or likelihood that a particular event (e.g., key word) either is or is not present in the sample. For example, features may be extracted from the input 102. The extracted features, which may be numbers representing some measurement or which may be the result of some calculation or other function, can be input into a modelling function or otherwise processed to produce a score. The score may represent or be associated with the likelihood that the input 102 includes a particular keyword. If the score exceeds the detection threshold, the detection system 100 may return a positive detection without further processing of the input 102 by other stages 106-108 of the cascade. By stopping the processing of the input 102 whenever the score exceeds the detection threshold 112, the latency experienced by a user waiting for a response to the specific input 102 is reduced in comparison with a conventional cascade detector which would continue processing the input using the remainder of the stages 106-108.

In addition to stopping the processing of the input 102 whenever the score exceeds the detection threshold 112, processing may be stopped if the score falls below the rejection threshold (e.g., the likelihood that the input includes the detection target is very low). In such cases, the detection system 100 may determine that the sample is a negative sample and return a rejection without further processing of the input 102 by the other stages 106-108. As a result, the only samples processed by subsequent stages of the cascade are those samples that have not triggered detections or rejections by any previous stage. Reaching a reliable result in detection processing may be more difficult for such samples. Later stages of the cascade can therefore be trained to discriminate between positive samples (e.g., samples including the detection target) and negative samples (e.g., samples not including the detection target) in these more difficult cases. Stages trained to process such samples may require more computational resources, more time, and/or may have an overall undesirable impact on the operational cost or latency of the detection system 100. By placing these stages after stages trained to process and recognize detection targets (or the lack thereof) in "easier" samples, any undesirable impact may be reduced, and may be experienced only in cases in which such costs or latency is needed to reach an acceptably reliable result.

In some embodiments, separate scores may be computed regarding the likelihood that the input includes the detection target and the likelihood that the input does not include the detection target. In such cases, different scores may be compared to the detection threshold 112 and rejection threshold 114, respectively.

Spoken Language Processing Environment

Figure 2:
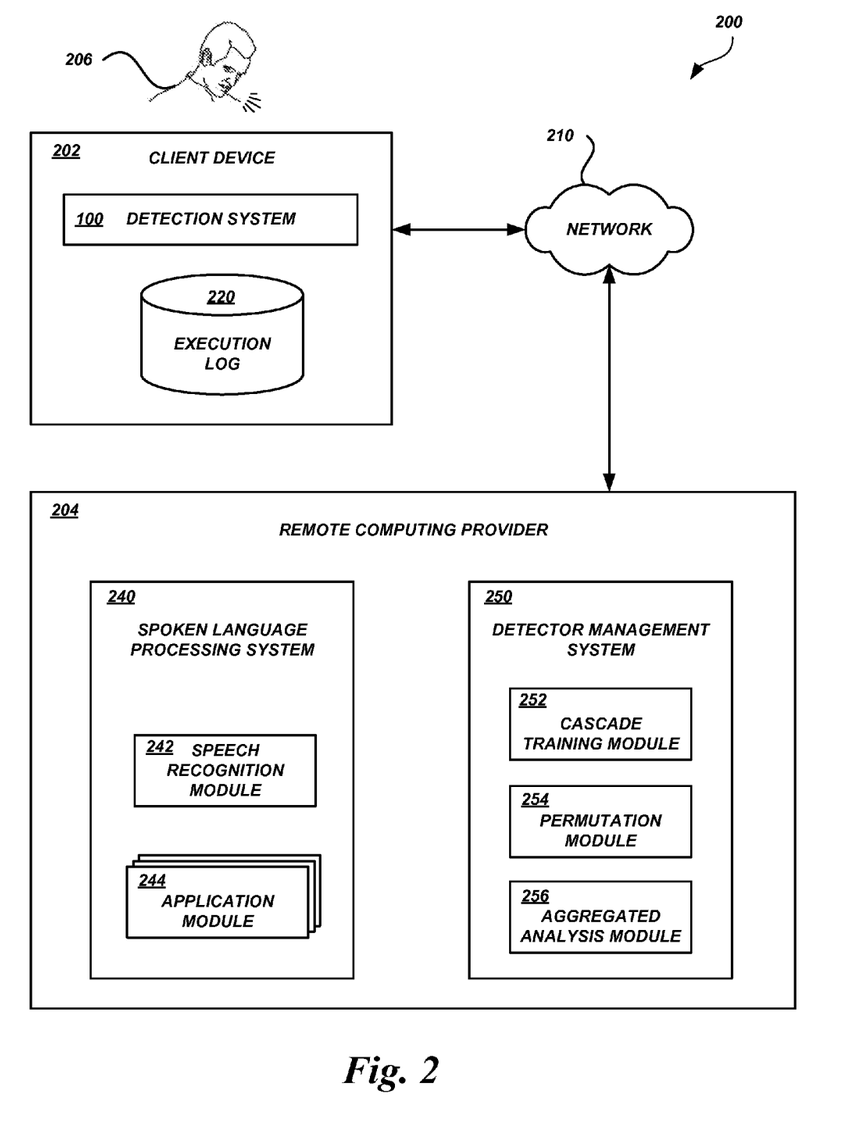
FIG. 2 is a block diagram of an illustrative network environment in which a cascade-based detection system may be implemented.

FIG. 2 shows an example environment 200 in which the cascade-based detection features of the present disclosure may be implemented. The environment 200 may include a client device 202 and a remote computing provider 204 in communication via a communication network 210.

The communication network 210 may be any wired network, wireless network, or combination thereof. In addition, the network 210 may be a personal area network, local area network, wide area network, cable network, satellite network, cellular telephone network, or combination thereof. For example, the communication network 210 may be a publicly accessible network of linked networks, possibly operated by various distinct parties, such as the Internet. In some embodiments, the communication network 210 may be a private or semi-private network, such as a corporate or university intranet. The communication network 210 may include one or more wireless networks, such as a Global System for Mobile Communications ("GSM") network, a Code Division Multiple Access ("CDMA") network, a Long Term Evolution ("LTE") network, or some other type of wireless network. Protocols and components for communicating via the Internet or any of the other aforementioned types of communication networks are well known to those skilled in the art of computer communications and thus need not be described in more detail herein.

The client device 202 may be a computing device that includes one or more processors and a memory which may contain software applications executed by the processors. The client device 202 may include or be in communication with one or more microphones or other audio input components for accepting audio input. The client device 202 may also include a cascade-based detection system 100 to perform keyword detection on the audio input. The client device 202 or detection system 100 may also include an execution log 220 for storing data regarding the operation of the detection system 100 during processing of audio inputs. For example, the execution log 220 may store, for each input sample or execution of the detection system 100 (or some subset thereof), data regarding the number of stages until a detection/rejection is triggered, elapsed time, detection scores at each stage, etc.

Illustratively, the client device 202 may be a personal computing device, laptop computing device, hand held computing device, terminal computing device, server computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

A user 206 may use the client device 202 to submit utterances, receive information, and initiate various processes, either on the client device 202 or at the remote computing provider 204. For example, the user 206 can listen to music via the client device 202 (or some system or output component in communication with the client device) and issue spoken commands to the client device 202. Some client devices 202 may be configured to accept, process, and/or respond to spoken commands without any non-verbal indication that the user is going to issue a spoken command rather than engage in conversation with another person. The user 206 may indicate that the client device 202 is being addressed by prefacing spoken commands and queries with a keyword or phrase, also known as a "wake word." The detection system 100 can be configured to detect the presence of the wake word in audio samples. Upon detection of the wake word by the detection system 100, the client device 202 may determine that the user is addressing the client device 202. The wake word may be followed shortly by a spoken command (e.g., the user 206 may utter the wake word and then utter a "play music" or "phone call" command). The client device 202 may process the subsequent utterance and initiate a response, or the client device 202 may provide audio data regarding the user utterance to the remote computing provider 204 for processing.

The remote computing provider 204 may include systems or modules for performing spoken language processing on audio data, such as a spoken language processing system 240. The spoken language processing system 240 may include a speech recognition module 242 for determining what a user said or meant after uttering the wake word (or without utterance of any wake word). One or more application modules 244 may be invoked depending upon the results generated by the speech recognition module 242. For example, if the user uttered a "play music" command, a "music" application module may be invoked to respond to the command. In some embodiments, a spoken language processing system 240 may include additional or fewer modules or components than those shown in FIG. 2.

The remote computing provider 104 may also include a detector management system 250 for generating, training, modifying, and/or otherwise managing the detection systems 100 used by client devices 202. The detector management system 250 may include a cascade training module 252, a permutation module 254, and an aggregated analysis module 256. The cascade training module 252 may use training data to train the model parameters for the stages of the cascade, set detection and/or rejection thresholds to reduce or minimize operational cost or latency, etc. as described in greater detail below. The permutation module 254 may take a trained cascade as input and determine a desired or optimum sequence for the stages of the cascade, as described in greater detail below. The aggregated analysis module 256 may take execution logging data from one or more client devices 202 as input and implement adjustments to the operational parameters of the cascade as also described in greater detail below. In some embodiments, a detector management system 250 may include additional or fewer modules or components than those shown in FIG. 2.

The detector management system 250 may be combined with or co-located with the spoken language processing system 240. For example, the detector management system 250 and spoken language processing system 240 may be part of a single physical or logical module, component, system or computing device (or group of devices). In some embodiments, the detector management system 250 may be physically or logically separated from the spoken language processing system 240. For example, the detector management system 250 may be or include a server or group of servers physically separated from the spoken language processing system 240 (e.g., on different physical machines, in different data centers, etc.). The individual modules and components of the spoken language processing system 240 may be physically or logically separate from each other, or may be combined into a single physical or logical module or component similar as described above. The individual modules and components of the detector management system 250 may also be physically or logically separate from each other, or may be combined into a single physical or logical module or component.

In some embodiments, the features and services provided by the remote computing provider 204 may be implemented as web services consumable via a communication network 210. In further embodiments, the remote computing provider 204 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Process for Generating Detection Cascades

Figure 3:
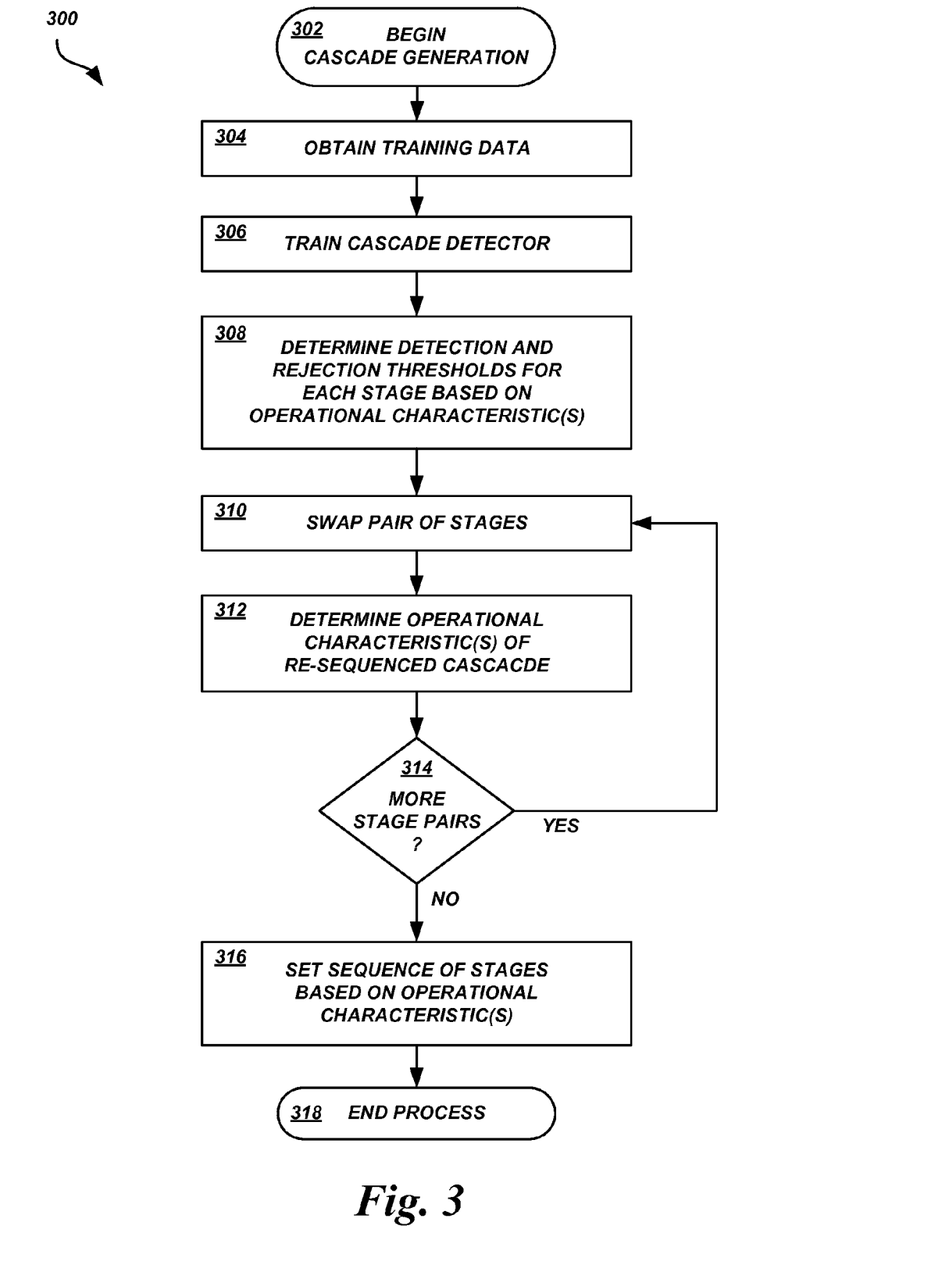
FIG. 3 is a flow diagram of an illustrative process for generating a cascade for a detection system.

FIG. 3 shows an illustrative process 300 for generating a detection cascade that may return detection of a detection target in a sample at any stage of the cascade. Advantageously, a detector management system 250 may implement the process 300 to generate a detection cascade optimized or otherwise designed to minimize or reduce some operational or performance characteristic, such as computational cost and/or latency.

The process 300 begins at block 302. The process 300 may be manually initiated by a system administrator or other user, may begin in response to some event, etc. The process 300 may be embodied in a set of executable program instructions stored on a computer-readable medium, such as one or more disk drives, of a computing device of the detector management system 250. When the process 300 is initiated, the executable program instructions can be loaded into memory of a computing device and executed by one or more processors in communication therewith.

At block 304, the cascade training module 252 or some other module or component of the detector management system 250 can obtain training data. The training data may consist of audio samples and corresponding data indicating which audio samples include a detection target, the correct transcription of each audio sample, or the like.

At block 306, the cascade training module 252 or some other module or component of the detector management system 250 may train a cascade. For example, the cascade training module 252 may process one or more input samples using the cascade, and determine at each stage (or after all stages) whether the cascade has correctly determined whether the detection target is present in the samples. The cascade training module 252 can modify model parameters associated with each stage (or some subset thereof) in order to achieve some desired result, such as an improvement in accuracy, a reduction in latency or operational cost, etc. The training process may be repeated in an iterative fashion until some training criterion is met, such as a desired accuracy or latency. Advantageously, because only a portion of samples make it to the next stage at any point in the cascade, the later stages may be trained specifically to process more difficult samples without concern for adding latency when processing easier cases. In some embodiments, the cascade may be trained in some other manner known in the art.

At block 308, the cascade training module 252 or some other module or component of the detector management system 250 may determine detection and rejection thresholds for each stage of the cascade. The cascade training module 252 can determine the thresholds based on one or more operational characteristics of the cascade detector. In some embodiments, the cascade training module 252 may set thresholds to optimize or achieve some desired latency or operational cost. For example, the detection and rejection thresholds of some early stage may be set so as to capture as many easily detected positive and/or negative samples as possible. In this way, the overall operational cost attributable to processing easily detected negative samples with multiple stages is reduced. In addition, the overall latency attributable to processing easily detected positive samples with multiple stages is also reduced. As another example, the detection threshold of an early stage may be set so as to capture as many easily detected positive samples as possible, while the rejection threshold may be set such that more samples that fail to meet the detection threshold will be passed to subsequent stages. In this way, a larger portion of the samples will be processed by subsequent stages to reduce false negatives and improve accuracy without affecting the latency associated with the easily detectible positive samples.

The preceding examples are illustrative only, and are not intended to be exhaustive or limiting. In some embodiments, the thresholds of some stages may be set higher, lower, or equivalent to the thresholds of some other stages to achieve various desired results. In some embodiments, the thresholds may be set in conjunction with the training of the stages described above with respect to block 306. For example, the thresholds may also be modified at each point in the training process (or some subset thereof) that the model parameters are modified. As another example, blocks 306 and 308 may be repeated in an iterative fashion until some desired result is achieved.

At block 310, the permutation module 254 or some other module or component of the detector management system 250 may permute the sequence of cascade stages. Advantageously, by permuting the sequence of stages and determining the effect on various operational characteristics, an optimum or desired sequence for the stages may be determined. For example, if a cascade has three stages 1, 2 and 3 in a starting sequence of 1-2-3, the permutation module 254 may begin permuting the sequence by swapping stages 2 and 3 to give a sequence of 1-3-2.

At block 312, the permutation module 254 or some other module or component of the detector management system 250 may process the training data (or some subset thereof) using the current permutation for the sequence of cascade stages. The permutation module 254 can then determine whether the current permutation has any effect on various operational characteristics, such as operational cost or latency.

At decision block 314, the permutation module 254 can determine whether there are any additional permutations to be tested. If so, the process 300 can return to block 310. In the present example, the process can return to block 310 to test the effectiveness of sequences 2-1-3, 2-3-1, 3-2-1, and 3-1-2.

At block 315, the permutation module 254 or some other module or component of the detector management system 250 can set or select the sequence of stages based on the operational characteristic(s) determined above. For example, the permutation module 254 can select the sequence that produces the lowest latency, the lowest operational cost, the lowest combined latency and operational cost, the lowest latency with an acceptable level of accuracy, etc.

In some embodiments, the permutation module 254 may include or employ a hardware shift register in order to determine the desired sequence of stages. Each execution of a particular sequence to process a training sample may be represented by a bit array. The bit array may include a separate bit corresponding to each stage of the cascade. The bit for a particular stage may be set to 1 if the detection target was detected in the sample at that stage; otherwise the bit for that particular stage may be set to (or remain) 0. The shift register can then be used to quickly determine, for each sequence of stages and each sample of training data, the number of stages required to detect the detection target if such a detection occurred. The determined number of stages may serve as a proxy for certain operational characteristics, such as latency or cost. Using such a shift register and collection of bit arrays can allow the permutation module 254 to acquire an exhaustive set of operational data regarding every possible permutation (or some subset thereof) of stage sequences for every sample of training data (or some subset thereof).

In some embodiments, the permutation module may also or alternatively use bit arrays for rejections. For example, such a bit array may include a separate bit corresponding to each stage of the cascade. However, the bit for a particular stage may be set to 1 if the sample was rejected at that stage as not including the detection target; otherwise the bit for that particular stage may be set to (or remain) 0. The shift register can then be used to quickly determine, for each sequence and each sample, the number of stages required to reject the sample if such a rejection occurred.

At block 318, the process 300 may terminate.

Process for Using Detection Cascades

Figure 4:
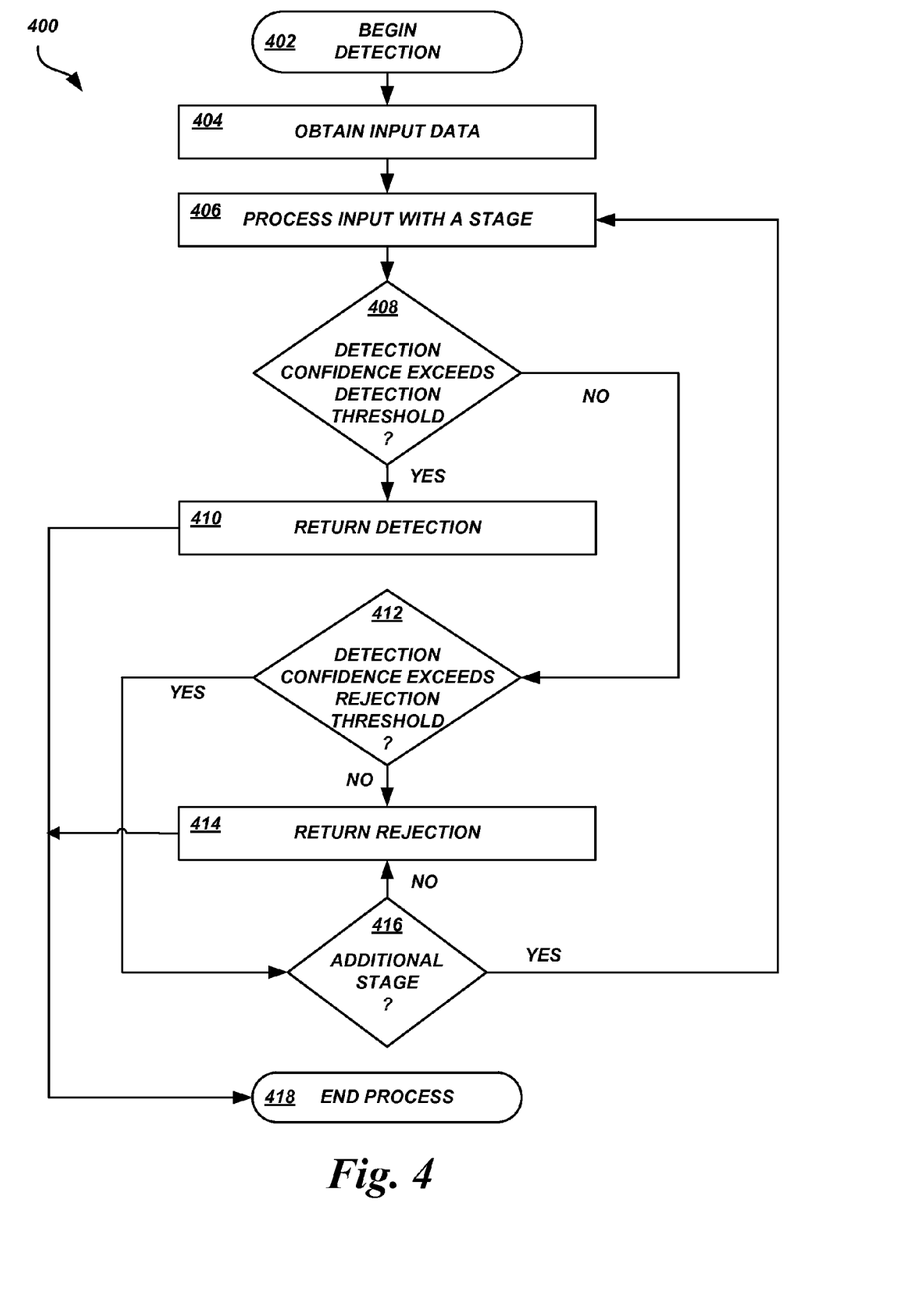
FIG. 4 is a flow diagram of an illustrative process for using a cascade-based detection system.

FIG. 4 shows an illustrative process 400 for using a cascade-based detector. Advantageously, the process 400 may be implemented by a detection system 100 that includes a cascade configured to return detection of a detection target in a sample at any stage of the cascade.

The process 400 begins at block 402. The process 400 may be automatically invoked upon receipt of an audio sample, manually initiated by a user, may begin in response to some other event, etc. The process 400 may be embodied in a set of executable program instructions stored on a computer-readable medium, such as one or more disk drives, of a client device 202. When the process 400 is initiated, the executable program instructions can be loaded into memory of a computing device and executed by one or more processors in communication therewith.

At block 404, the detector 100 may obtain input data. In the key word spotting implementation, the input data may be raw audio data received from a microphone, features extracted from audio data, or some other representation of audio.

At block 406, the detector 100 can begin processing the input with the cascade. The detector 100 can compute a detection score for the input at the first stage of the sequence, and process 400 may proceed to decision block 408 where the detector 100 can determine whether the score meets or exceeds the detection threshold. If so, the process 400 may proceed to block 410 where the detection is returned, and then the process 400 may terminate at block 418. Otherwise, if the score does not meet or exceed the detection threshold, the process 400 may proceed to decision block 412.

At block 412, the detector 100 can determine whether the score fails to meet or exceed the rejection threshold (or whether a separate rejection score exceeds the rejection threshold). If so, the process 400 may proceed to block 414 where the rejection is returned, and then the process 400 may terminate at block 418. Otherwise, if the score does meet or exceed the rejection threshold, the process 400 may proceed to decision block 416.

At decision block 416, the detector 100 can determine whether there are additional stages of the cascade remaining that can be used to process the input data. If so, the process 400 may return to block 406. Otherwise, a rejection may be returned and the process 400 may terminate. In some embodiments, if there are no remaining stages left at decision block 416, a detection may be returned and the process 400 may terminate.

Process for Modifying Detection Cascades

Figure 5:
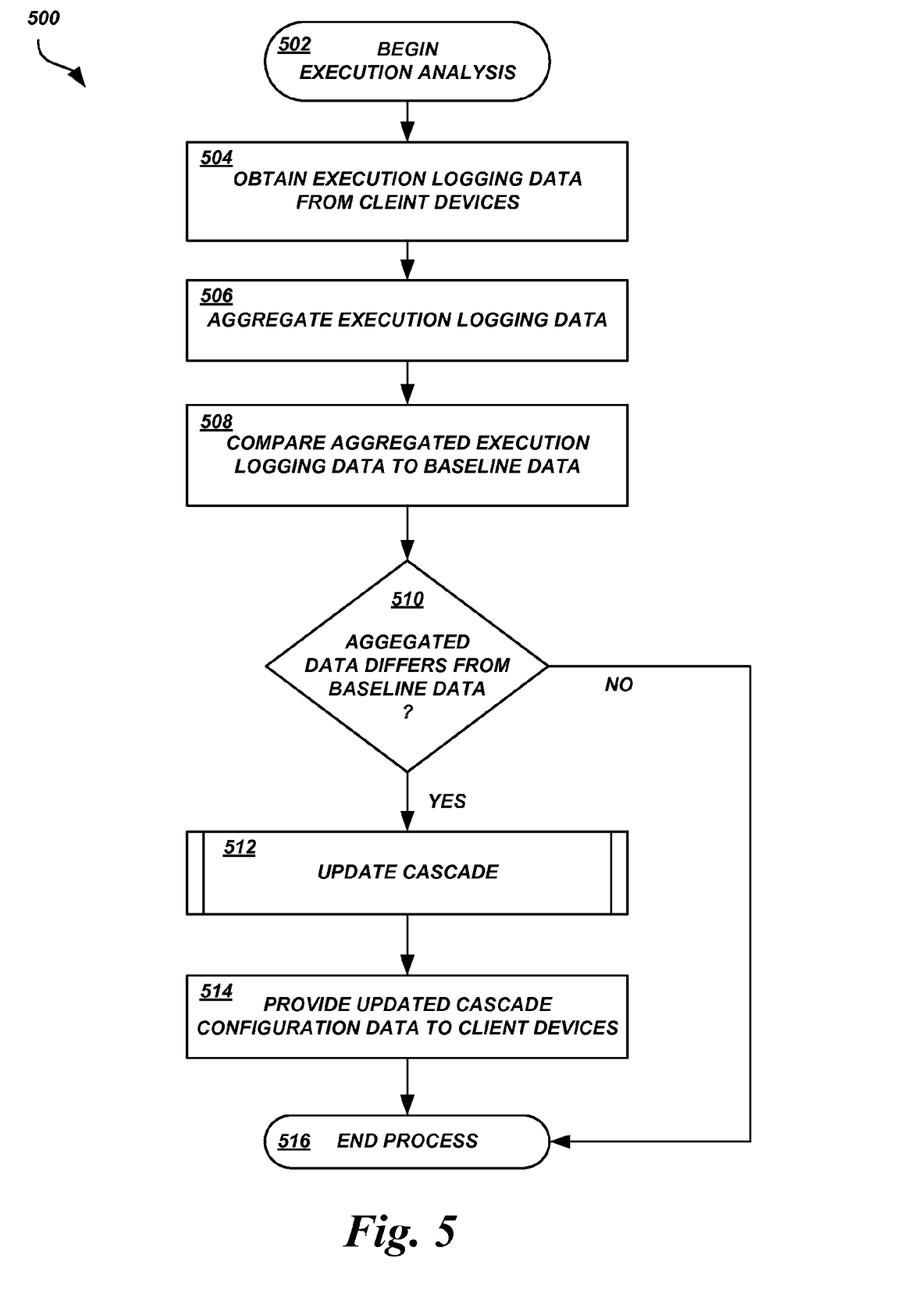
FIG. 5 is a flow diagram of an illustrative process for modifying a cascade for a detection system.

FIG. 5 shows an illustrative process 500 for modifying a cascade-based detector. Advantageously, the process 500 may be implemented by a detector management system 250 to update the configuration of a cascade based on an analysis of execution logging data regarding real-world use of the cascade at one or more client devices 202. Such updates may be used to improve the performance of the cascade or to modify operational parameters of the cascade to achieve some other desired effect.

The process 500 begins at block 502. The process 500 may be automatically invoked upon receipt of execution logging data from one or more client devices 202, may be manually initiated by a system administrator or other user, may begin in response to some event, etc. The process 500 may be embodied in a set of executable program instructions stored on a computer-readable medium, such as one or more disk drives, of a detection management system 250. When the process 500 is initiated, the executable program instructions can be loaded into memory of a computing device and executed by one or more processors in communication therewith.

At block 502, the aggregated analysis module 256 or some other module or component of the detector management system 250 may obtain execution logging data from one or more client devices 202. For example, the client devices 202 may be configured to provide execution logging data for each input sample processed (or some subset thereof), in batches after every N audio samples are processed (where N is some integer), on a schedule (e.g., weekly or monthly), in response to a request from the detector management system 250, etc. The execution logging data for any given input sample may include data regarding the operation of the detection system 100 when processing the sample, such as the number of stages through which the sample passes or the elapsed time before a detection or rejection is triggered, the detection and/or rejection scores computed at each stage, etc. In some embodiments, the aggregated analysis module 256 may obtain annotations for the samples indicating whether or not the cascade correctly returned a detection or rejection. For example, the audio samples may be provided to a human listener who determines the accuracy of the detection system's determination.

At block 506, the aggregated analysis module 256 or some other module or component of the detector management system 250 may aggregate or summarize the execution logging data obtained above. The data may be aggregated in a manner that facilitates comparison to some baseline or target data, data obtained during training, or the like. In some embodiments, only a subset of execution data may be aggregated, or the execution data may be aggregated into two or more groups. For example, execution data may be aggregated into groups based on one or more user characteristics (e.g., execution data obtained from devices operated by users with particular demographic characteristics and/or dialects), one or more device characteristics (e.g., execution data obtained from devices with particular technical capabilities or characteristics), some combination thereof, or the like. In this way, the processing described below may be performed in a targeted manner, resulting in thresholds and/or sequences that are optimized or selected for particular subsets of users or devices.

At block 508, the aggregated analysis module 256 or some other module or component of the detector management system 250 can compare the aggregated data to some baseline data, data obtained during training, or the like.

At decision block 510, the aggregated analysis module 256 or some other module or component of the detector management system 250 can determine whether the aggregated data differs from the baseline data in a meaningful or actionable manner. For example, the aggregated analysis module 256 can determine whether the observed data is evidence of lower performance, higher cost, or higher latency than expected. As another example, the aggregated analysis module 256 can determine whether the observed data is outside of some desired rang, or fails to meet some threshold. If so, the process 500 may proceed to block 512. Otherwise, the process may terminate at block 516.

At block 512, the aggregated analysis module 256 or some other module or component of the detector management system 250 can update the cascade. The aggregated analysis module 256 may employ the cascade training module 252 and/or the permutation module 254 in order to update the cascade. For example, the cascade training module 252 may determine a desired adjustment or target criterion for the cascade, and the cascade training module 252 may re-train the cascade in order to achieve the desired effect. In some embodiments, the cascade training module 252 may use input samples obtained from client devices 202 and annotated as described above in order to train or re-train the cascade using real-world data. As another example, the permutation module 254 may determine a new or updated sequence for the cascade, rather than re-training the cascade, in order to achieve a desired effect. As a further example, other differential updates may be generated instead of re-training the cascade, such as updates to one or more thresholds in order to achieve some desire effect.

At block 514, the detector management system 250 can provide updated cascade configuration data to one or more of the client devices 202. The cascade configuration data may include updated model parameters for one or more stages, updated thresholds for one or more stages, an updated sequence for the stages, etc. In some embodiments, a new cascade may be provided rather than configuration data.

In some embodiments, rather than aggregating data from multiple client devices 202, data from a single client device may be analyzed and updated cascade configuration data may be generated for use by the client device.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
 a computer-readable memory storing executable instructions; and
 one or more processors in communication with the computer-readable memory, wherein the one or more processors are programmed by the executable instructions to at least:
  obtain information regarding a detection cascade configured to detect a keyword in an audio sample, the detection cascade comprising a plurality of stages including a first stage associated with a first model and a second stage associated with a second model;
  determine a first detection threshold associated with the first stage, wherein a first detection score greater than the first detection threshold indicates that the keyword is present in the audio sample, and wherein the first detection score is computed using the audio sample and the first model;
  determine a first rejection threshold associated with the first stage, wherein the first detection score less than the first rejection threshold indicates that the keyword is not present in the audio sample;
  determine a second detection threshold associated with the second stage, wherein a second detection score greater than the second detection threshold indicates that the keyword is present in the audio sample, and wherein the second detection score is computed using the audio sample and second model;
  determine a second rejection threshold associated with the second stage, wherein the second detection score less than the second rejection threshold indicates that the keyword is not present in the audio sample;
  obtain, for at least two permutations of the plurality of stages, latency data regarding use of the detection cascade to process the audio sample; and
  determine a sequence for the plurality of stages based at least on the latency data, wherein the detection cascade returns a detection at any stage of the sequence if a detection score exceeds a corresponding detection threshold.

2. The system of claim 1, wherein the first detection threshold and first rejection threshold are determined based at least on an empirical analysis of detection scores computed using training audio samples and the first model.

3. The system of claim 1, wherein first detection threshold is determined based at least on the latency data.

4. The system of claim 1, further comprising a hardware shift register configured to processes a bit array, wherein each bit of the bit array corresponds to a stage of the cascade, and wherein a value of each bit of the bit array indicates whether a detection score exceeded a detection threshold associated with the corresponding stage.

5. The system of claim 4, wherein the sequence is determined based at least in part on hardware shift register output.

6. A computer-implemented method comprising:
 as implemented by one or more computing devices configured to execute specific instructions,
  obtaining information regarding a detection cascade configured to detect an event in an audio sample, the detection cascade comprising a plurality of stages including a first stage and a second stage, each stage of the plurality of stages corresponding to a model;
  determining a first detection threshold for the first stage and a second detection threshold for the second stage;
  determining a first rejection threshold for the first stage and a second rejection threshold for the second stage; and
  determining a sequence for the plurality of stages based at least on one or more performance characteristics associated with one or more sequential permutations of the plurality of stages,
  wherein the detection cascade returns a detection at any stage of the sequence if a detection score exceeds a detection threshold for the stage.

7. The computer-implemented method of claim 6, wherein the event comprises one of an occurrence of a keyword in audio data, an occurrence of a face in image data, or an occurrence of a written character in image data.

8. The computer-implemented method of claim 6, wherein a first detection score greater than the first detection threshold indicates that the event is present in the audio sample, and wherein the first detection score is computed using the audio sample and a first model corresponding to the first stage.

9. The computer-implemented method of claim 6, further comprising determining the performance characteristics based at least on processing test audio samples using the detection cascade.

10. The computer-implemented method of claim 6, wherein the one or more performance characteristics comprise latency or computational cost.

11. The computer-implemented method of claim 6, further comprising receiving execution data from one or more client computing devices, wherein the execution data relates to processing of audio samples using the detection cascade.

12. The computer-implemented method of claim 11, wherein the execution data includes at least one of observed latency or a computed detection score.

13. The computer-implemented method of claim 11, wherein determining the first detection threshold is based at least on the execution data.

14. The computer-implemented method of claim 11, wherein determining the sequence for the plurality of stages is based at least on the execution data.

15. The computer-implemented method of claim 6, further comprising transmitting cascade configuration information to the one or more client computing devices, the cascade configuration information indicating at least one of: the first detection threshold, or the sequence for the plurality of stages.

16. The computer-implemented method of claim 6, wherein the second detection threshold is different than the first detection threshold.

17. The computer-implemented method of claim 6, wherein a first detection score less than the first rejection threshold indicates that the event is not present in the audio sample.

18. The computer-implemented method of claim 6, wherein the second rejection threshold is different than the first rejection threshold.

19. Non-transitory computer readable storage comprising executable instructions that, when executed, cause one or more computing devices to perform a process comprising:
  accessing information regarding a detection cascade comprising a first stage and a second stage, the first stage associated with a first model and a first detection threshold, and the second stage associated with a second model and a second detection threshold;
  computing a first detection score using audio data and the first model, the first detection score indicating a likelihood that an event is present in the audio data;
  determining whether the first detection score exceeds the first detection threshold;
  in response to determining that the first detection score exceeds the first detection threshold, generating data indicating that the event has been detected, wherein the audio data is not subsequently processed using the second stage; and
  in response to determining that the first detection score does not exceed the first detection threshold, computing a second detection score using the audio data and the second model.

20. The non-transitory computer readable storage of claim 19, wherein the event comprises one of an occurrence of a keyword in audio data, an occurrence of a face in image data, or an occurrence of a written character in image data.

21. The non-transitory computer readable storage of claim 19, the process further comprising storing execution data in connection with processing the audio data with the cascade, the execution data relates to at least one of: observed latency, a computed detection score, or elapsed time.

22. The non-transitory computer readable storage of claim 21, the process further comprising transmitting at least a portion of the execution data to a network-accessible server system.

23. The non-transitory computer readable storage of claim 19, the process further comprising receiving, from a network-accessible server system, at least one of: the detection cascade, an updated detection cascade, or cascade configuration information.

* * * * *